(12) United States Patent
Han et al.

(10) Patent No.: US 8,008,570 B2
(45) Date of Patent: Aug. 30, 2011

(54) DISPLAY ASSEMBLY AND DISPLAY DEVICE HAVING THE SAME

(75) Inventors: Sang-Sun Han, Cheonan-si (KR);
Yong-Woo Kim, Seoul (KR);
Sang-Hyeok Lee, Cheonan-si (KR);
Jae-Hwan Chun, Suwon-si (KR);
Jong-Ho Won, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 310 days.

(21) Appl. No.: 12/354,730

(22) Filed: Jan. 15, 2009

(65) Prior Publication Data

US 2009/0237586 A1   Sep. 24, 2009

(30) Foreign Application Priority Data

Mar. 19, 2008   (KR) .................. 10-2008-0025243

(51) Int. Cl.
*G10H 3/18*   (2006.01)

(52) U.S. Cl. ............................. 84/731; 349/58
(58) Field of Classification Search ............ 84/731; 349/58

See application file for complete search history.

(56) References Cited

U.S. PATENT DOCUMENTS

| 6,292,239 | B1 * | 9/2001 | Nagamura et al. ........... 349/58 |
| 6,593,979 | B1 | 7/2003 | Ha et al. |
| 7,106,393 | B2 * | 9/2006 | Lee ........................... 349/58 |
| 7,375,775 | B2 * | 5/2008 | Kim ........................... 349/58 |
| 7,651,257 | B2 * | 1/2010 | Shin .......................... 362/633 |
| 2003/0043310 | A1 | 3/2003 | Cho |
| 2006/0203144 | A1 | 9/2006 | Kim |

FOREIGN PATENT DOCUMENTS

| JP | 2001-142054 | 5/2001 |
| KR | 2001-0001271 | 1/2001 |
| KR | 2003-0028970 | 4/2003 |

\* cited by examiner

*Primary Examiner* — Jianchun Qin
(74) *Attorney, Agent, or Firm* — Innovation Counsel LLP

(57) ABSTRACT

In accordance with one or more embodiments of the present disclosure, a display assembly received in a cover by the front mounting method, a combining recess is formed on a corner formed at which a side part and an upper portion of a supporting part meet together, and a first hole is formed on a bottom of the combining recess. A first opening exposing the first hole is formed in a top surface part of a front receiving frame. A bottom part of a rear receiving frame supporting a rear face of a display module has a second hole corresponding to the first hole. An incision portion opening the sidewall part of the rear receiving frame exposes the second hole, the first reinforcement member is bent around an edge of the sidewall part, and connects the opposite edges. As such, the width of a frame of the cover is reduced, and the rear receiving frame improves the strength against external force.

30 Claims, 14 Drawing Sheets

DISPLAY ASSEMBLY AND DISPLAY DEVICE HAVING THE SAME

CROSS-REFERENCE TO RELATED APPLICATIONS

This application claims priority to and the benefit of Korean Patent Application No. 2008-25243, filed on Mar. 19, 2008, in the Korean Intellectual Property Office (KIPO), the contents of which are herein incorporated by reference in their entirety.

BACKGROUND

1. Technical Field

The present invention relates to a display assembly and a display device having the same, and in particular, to a structure combining a flat plate display assembly and a cover by a front mounting method and a display device having the same.

2. Related Art

Generally, a liquid crystal display (LCD) is a type of flat panel display device that includes a backlight assembly supplying light and a LCD panel which displays an image using the light. The LCD device is used in various industrial fields and has advantageous characteristics, such as thin thickness, light weight, low power consumption, low driving voltage, etc. The LCD device is widely used in large sized electronic devices such as a television receiver set.

In the large-sized LCD devices, a cover directly exposed to a user, for example, a front cover or a rear cover including a plastic material, receives the LCD device to protect the LCD device and have an excellent design. Typically, an edge of the LCD device may be covered by a metal chassis to protect the LCD panel and the backlight assembly. The chassis may be combined with the cover to secure the LCD device to the cover.

Conventional methods for combining the LCD device to the cover include a side mounting method and a front mounting method. In the side mounting method, a screw is used to attached a bracket to the front cover or the rear cover. The bracket forms a gap between the side of the LCD device and a side of the front cover, and the bracket increases a width of a frame of the front cover.

Reducing the width of the frame of the display device is preferred so as to reduce a slimness of the LCD device. The front mounting method has been presented to reduce the width of the display device in the side mounting method. In the front mounting method, the bracket is removed and a connecting structure is formed on a front surface of the chassis, which is combined with the front cover and the rear cover.

However, to assemble the LCD device without the bracket through the front mounting method, incision parts are formed in one or more sidewalls of the chassis of the LCD device to reduce interference with a connecting boss that is extended from the front cover or the rear cover. Thereby, the sidewall of the chassis has openings formed in several places so that a mechanical strength of the sidewall against an externally provided impact is decreased. For example, the sidewall having the opening is deformed against a bending stress.

As a result, a number of defects of the chassis are increased by the deformation during an assembly process of the LCD device.

SUMMARY

One or more embodiments of the present disclosure provide a display assembly having improved strength against an externally provided impact. One or more embodiments of the present disclosure also provide a display device having the above-mentioned display assembly.

In one embodiment, a display assembly includes a display module, a supporting frame, a front receiving frame, and a rear receiving frame. The display module displays an image. The supporting frame includes a supporting part supporting the display module, a side part connected to the supporting part, at least one combining recess formed on a corner formed at which the side part and an upper surface of the supporting part meet together. A first hole is formed on a bottom portion of the combining recess.

The front receiving frame includes a top surface part covering an edge portion of a display screen of the display module and has a first opening exposing the first hole. A side surface part of the front receiving frame is extended from the top surface part opposing to the side part of the rear receiving frame.

The rear receiving frame includes a bottom part, a sidewall part, an incision portion and a first reinforcement member. The bottom part supports a rear face of the display module and has a second hole corresponding to the first hole. The sidewall part is disposed between the side part of the supporting frame and the side surface part of the front receiving frame. The incision portion forms an indentation to expose the second hole. The first reinforcement member is bent to be spaced apart from the edge of the second hole, and connects mutually opposite edges formed by the incision portion.

The first reinforcement member may be extended from the edges of the sidewall part fits into the combining recess thereby fixing the supporting frame with the rear receiving frame. The first opening may expose the side surface part to a lower portion of the side surface part, and the front receiving frame may comprise a second reinforcement member connecting mutually opposite edges of the side surface portion, the edges being formed by the first opening.

The second reinforcement member may be bent to be spaced apart from the first hole so that the second reinforcement member may be received in the combining recess. The second reinforcement member may be apart from a lower portion of the side surface part. The second reinforcement member may be opposite to the first reinforcement member with respect to the first hole.

The first opening has the side surface part exposed to the lower portion of the side surface part and the first reinforcement member protrudes from the edges of the sidewall part toward the side surface part, so that the first reinforcement member is inserted into the first opening. The front receiving frame further comprises a second reinforcement member connecting mutually opposite edges of the side surface portion, the edges being formed by the first opening. The first reinforcement member is arranged on an upper edge of the second reinforcement member. An inclined part inclining toward the side part with respect to the second reinforcement member is formed at an upper edge of the first reinforcement member. In contrast, the second reinforcement member is overlapped with an outer surface of the first reinforcement member. The second reinforcement member is disposed at the upper of the first reinforcement member and opposite to the first reinforcement member with respect to the first hole to be received in the combining recess.

In example embodiments, the supporting frame further comprises a third hole corresponding to a corner portion of the supporting frame to be formed at the supporting part, the corner portion being formed by connecting each of side parts of the supporting frames. The front receiving frame further comprises a second opening formed at a front corner of the front receiving frame corresponding to the supporting frame corner, the second opening exposing the third hole, and the rear receiving frame further comprises a third opening formed at a rear corner of the rear receiving frame corresponding to the supporting frame corner, the third opening exposing the third hole.

The display module comprises a backlight part that emits light and is received in the rear receiving frame. The display panel unit is received in the front receiving frame, and is supported by the upper portion of the supporting part and displays an image using the light.

The backlight part includes a plurality of lamp units disposed on the bottom part in a direction substantially perpendicular to the sidewall part, a side frame having a plurality of guide recesses receiving edge portions of the lamp units and disposed between the bottom part and the supporting part, an optical member disposed between an upper surface of the side frame and a lower surface of the supporting part.

A plurality of guide recesses is formed at an inner side of the side part opposite to the combing recess. The backlight part includes a plurality of lamp units received in the guide recesses, an optical member disposed between the upper portion of the supporting part and a lower portion of the display panel unit.

According to another aspect of the present disclosure, a display device includes a display module, a supporting frame, a front receiving frame, a rear receiving frame, a front cover, a rear cover and a combining member.

The supporting frame includes the supporting part supporting the display module, the side part extending from an edge portion of the supporting part, at least one combining recess formed on a corner formed at which the side part and an upper surface of the supporting part meet together, the first hole being formed on a bottom portion of the combining recess.

The front receiving frame includes a top surface part covering an edge portion of the display screen of the display module and has a first opening exposing the first hole, and a side surface part of the front receiving frame is extended from the top surface part opposing to the side part of the rear receiving frame.

The rear receiving frame includes a bottom part, a sidewall part, an incision portion and a first reinforcement member. The bottom part supports a rear face of the display module and has a second hole corresponding to the first hole. The sidewall part is disposed between the side part and side surface part, and the forms an indentation to expose the second hole. The first reinforcement member is bent to be spaced apart from the second hole and connects the mutually opposite edges formed by the incision portion. The front cover receives the front receiving frame to expose the display screen. The rear cover opposite to the front cover is combined with the front cover, and receives the rear receiving frame. The connecting member connects the front cover to the rear cover by being inserted through the first and second holes.

In an example embodiment, the front cover includes a front body receiving the front receiving frame, a combining part extending from the front body to penetrating the first opening to be disposed on the bottom surface. The connecting member is inserted into the combining part through the rear cover, the second hole and the first hole. In example embodiments, the front receiving frame may comprise a second reinforcement member. The side surface part is exposed to a lower portion by the first opening.

In an example embodiment, the second reinforcement member connects mutually opposite edges of the side surface part by the first opening. The first and the second reinforcement members are bent to be spaced apart from the first hole, respectively, so that the first and the second reinforcement members are received in the combining recess, respectively. The first and the second reinforcement members are disposed at an opposite of a side of the combining recess with respect to the first hole. The first reinforcement member is overlapped with an upper edge portion of the second reinforcement member. Alternatively, the second reinforcement member may be overlapped with an outer surface of the first reinforcement member. In another example embodiment, one of the first and the second reinforcement members is received in the combining recess to be spaced apart from the first hole, and the other protrudes toward a direction opposite to the combining recess.

According to the display device as described in embodiments of the present disclosure, the incision portion is formed in the sidewall part of the rear receiving frame and/or the front receiving frame which receive the display module so that the display assembly is combined with the cover through the front mounting method. The reinforcement member improves the strength of the sidewall part by mutually connecting opposite edges of the sidewall having the incision portion. Therefore, the strength of the display assembly against an externally provided impact is improved, and the width of frame of display device is reduced.

BRIEF DESCRIPTION OF THE DRAWINGS

The above and other features and advantages of the present disclosure will become more apparent by describing in detailed example embodiments thereof with reference to the accompanying drawings, in which.

DETAILED DESCRIPTION OF EMBODIMENTS

Figure 1:
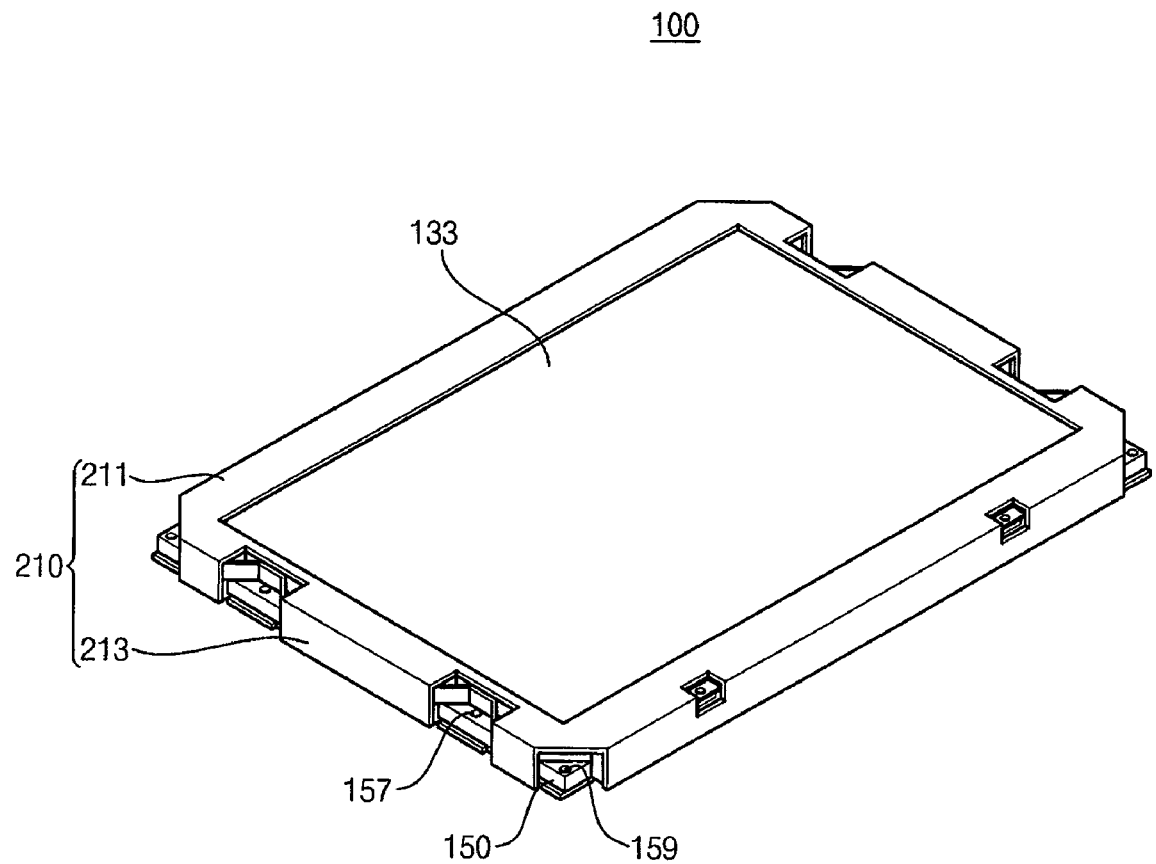
FIG. 1 is a perspective view showing the display assembly according to an exemplary embodiment of the present disclosure.

The present disclosure is described more fully hereinafter with reference to the accompanying drawings, in which example embodiments of the present disclosure are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the disclosure are described herein with reference to cross-sectional illustrations that are schematic illustrations of idealized example embodiments (and intermediate structures) of the present disclosure. As such, variations from the shapes of the illustrations as a result, for example, of manufacturing techniques and/or tolerances, are to be expected. Thus, example embodiments of the present disclosure should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Hereinafter, the present disclosure is explained in detail with reference to the accompanying drawings.

Figure 2:
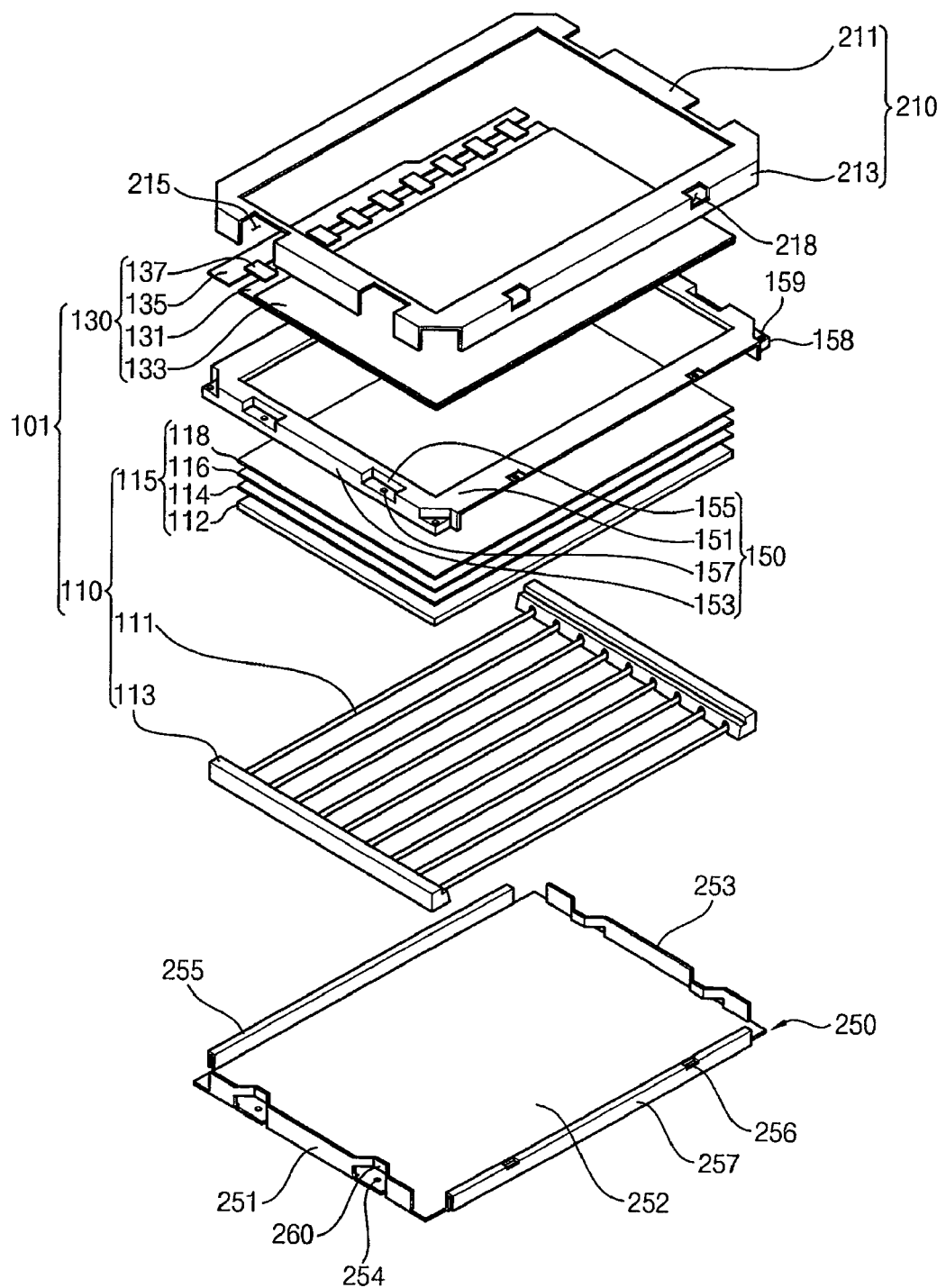
FIG. 2 is an exploded perspective view showing a display assembly in FIG. 1.

FIG. 1 is a perspective view showing the display assembly according to an exemplary embodiment of the present disclosure. FIG. 2 is an exploded perspective view showing a display assembly in FIG. 1.

Referring to FIGS. 1 and 2, the display assembly 100 is combined with a cover (not shown) by a front mounting method. The display assembly 100 includes a display module 101, a supporting frame 150, a front receiving frame 210 and a rear receiving frame 250.

As shown in FIG. 2, the display module 101 comprises a flat panel display device and display an image on a display screen. The display module 101 includes a backlight part 110 and a display panel part 130. The backlight part 110 emits light, and the display panel part 130 is arranged on the backlight part 110 to display the image using the light emitted from the backlight part 110.

The backlight part 110 includes a plurality of lamp units 111, a side frame 113 and an optical member 115. The lamp unit 111 includes a lamp and a lamp socket. The lamp may be a cold cathode fluorescent lamp. The lamp socket protects an electrode portion of the lamp by wrapping an edge portion of the lamp.

A plurality of the lamps may be arranged substantially in parallel, and the side frame 113 covers a plurality of lamp sockets combined with the edge portions of the lamps. The side frame 113 aligns the lamp units 111 substantially in parallel, and guide recesses, at which lamps are guided, are formed in a side of the side frame 113. In an upper portion of the side frame 113, a step portion, at which the optical member 115 is arranged, is formed.

In one embodiment, the optical member 115 diffuses and condenses the light emitted from the lamp units 111. The optical member 115 may include a diffusion plate 112, a first light collection sheet 114, a second light collection sheet 116 and a protection sheet 118, which are stacked in sequence.

The display panel part 130 displays the image using the light emitted from the optical member 115. The display panel part 130 includes a display panel, a printed circuit board 135 and a flexible circuit film 137.

In one embodiment, the display panel is arranged on an upper surface of the optical member 115. The display panel includes a lower substrate 131, an upper substrate 133, and a liquid crystal layer. The printed circuit board 135 outputs an image data signal to the display panel. The flexible circuit film 137 electrically connects a pad that is formed on the edge of the lower substrate 131 of the display panel and the printed circuit board 135.

In one embodiment, the supporting frame 150 may be formed through a plastic molding method. The supporting frame 150 is adapted to support the display module 101. The supporting frame 150 includes a supporting part 151, a side part 153, at least one combining recess 155 and a first hole 157.

The supporting part 151 has a quadrilateral frame shape having an opening corresponding to the display screen. The supporting part 151 includes first sides opposite to each other, and second sides, which are substantially longer than the first sides and opposite to each other. A step portion, at which the display panel is arranged, is formed in the upper surface of the supporting part 151. A lower surface of the supporting part 151 presses a peripheral portion of the optical member that is arranged on the side frame 113. The lamps are arranged substantially in parallel with the second sides of the supporting frame 151.

The side part 153 may be extended from the first sides of the supporting part 151 in the lower direction that is substantially orthogonal to the supporting part 151 from the first sides of supporting part. In FIG. 2, the side part 153 is protruded from outer sides of the second sides of the supporting frame 151, and a side part (not shown) may be protruded from outer sides of the first sides of the supporting frame 151. Alternatively, the side part 153 may not be extended from the outer sides of the second sides of the supporting part 151

The combining recess 155 is formed on edges at which the upper surface of the supporting part 151 is connected to the side part 153. Therefore, the combining recess 155 is exposed to two directions, i.e., the upper and side directions. The combining recess 155 has a side surface, which is substantially orthogonal to the upper surface of the supporting part 151, and a bottom surface which is substantially in parallel with the upper surface of the supporting part 151. The first hole 157 is formed through the bottom surface of the combining recess 155. The first hole 157 may be used to fix the display assembly 100 to the cover by the front mounting method.

Figure 3:
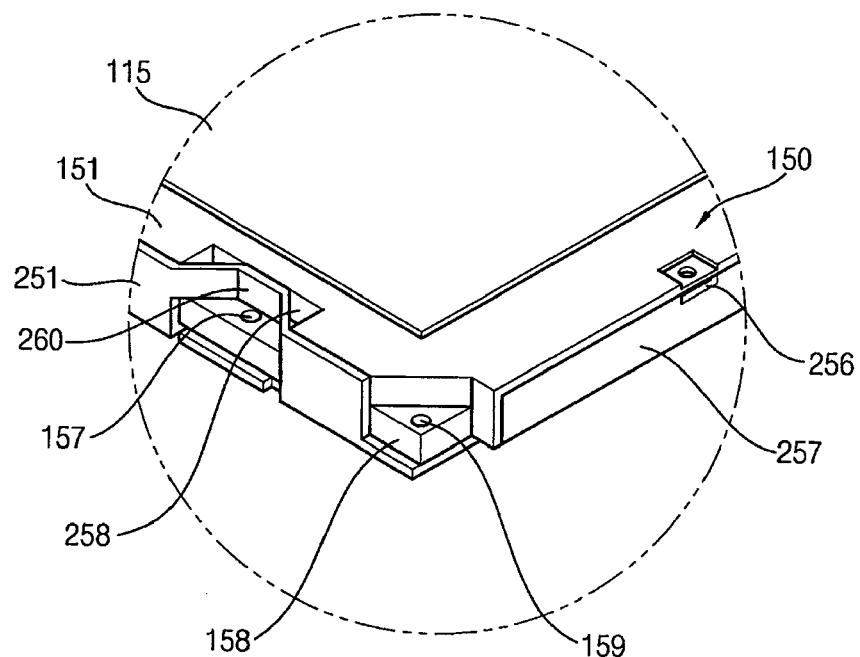
FIG. 3 is a perspective view illustrating a combination of the rear receiving frame and the supporting frame in FIG. 2.

FIG. 3 is a perspective view illustrating a combination of the rear receiving frame and the supporting frame in FIG. 2. Referring to FIGS. 2 and 3, the rear receiving frame 250 includes a bottom part 252, a sidewall part (not shown), an incision portion (not shown) and a first reinforcement member 260. The supporting frame 150 is arranged on the upper surface of the bottom part 252. The support portion 151 of the supporting frame 150 is arranged on the edge of the bottom part 252. The lower portion of the side part 153 of the supporting frame 150 is supported by the bottom part 252.

Since the supporting frame 150 has a frame shape, the backlight part 110 is arranged on the bottom part 252 exposed by the supporting frame 150. The lamps are arranged on the bottom part 252, and the side frame 113 is arranged on the edge portions of lamps. The bottom part 252 has a four-cornered plate shape, and the second hole 254 corresponding to the first hole 157 formed on the support portion 151 is formed in the edge of the shorter sides of the bottom part 252.

The sidewall part is extended from the bottom part 252. The sidewall part includes a first sidewall 251, a second sidewall 253, a third sidewall 255 and a fourth sidewall 257.

The first sidewall 251 and the second sidewall 253 facing the first sidewall 251 are extended from the bottom part 252 opposite to the side of the side part 153 of the supporting frame 150. The incision portion corresponding to the combining recess 155 is formed in the first sidewall 251 and the second sidewall 253. Since the shape of the first sidewall 251 has substantially the same shape as the second sidewall 253, the first sidewall 251 is mainly illustrated, and the repetitive descriptions will be omitted.

The incision portion is formed by removing a portion of the first sidewall 251 from the upper portion of the first sidewall 251 to the bottom part 252, so an indentation is formed at the incision portion to expose the second hole 254. The opposite edges in the first sidewall 251 are formed by the incision portion. The incision portion exposes the combining recess 155 in the side direction, as the above mentioned, and the second hole 254 corresponding to the first hole 157 is arranged in the bottom part 252 between the edges of the first sidewall 251.

In reference to FIG. 3, the first reinforcement member 260 connects the opposite edges of the first sidewall 251 formed by the incision portion. Therefore, the first reinforcement member 260 reinforces the strength of the first sidewall 251, which may be weakened by the incision portion 258. In one aspect, the first reinforcement member 260 is integrally formed with the first sidewall 251 as a single body, and is formed to be spaced apart from the first opening 215 by being bent on a peripheral portion of the first hole 157 formed on the bottom part 252.

In one embodiment, referring to FIG. 3, the first reinforcement member 260 is received in the combining recess 155. The first reinforcement member 260 is extended to the gap between the side portion of the combining recess 155 and the first hole 157 to expose the first hole 157 in the upper direction.

In reference to FIG. 3, the first reinforcement member 260 is disposed along the side surface of the combining recess 155, but has an inclined surface in plural positions of the first reinforcement member 260. Alternatively, the first reinforcement member 260 may be bent on a peripheral portion of the side surface of the combining recess 155 to be spaced apart from the first hole 157. In one aspect, the first reinforcement member 260 when inserted in the combining recess 155 guides the connecting position between the supporting frame 150 and the rear receiving frame 250.

The third sidewall 255 and the fourth side wall 257 are arranged in an opposing position, and are arranged in a direction that is orthogonal to the first sidewall 251 and the second sidewall 253. The third sidewall 255 and the fourth sidewall 257 have substantially the same shape. The supporting part 151 is supported by the upper portion of the third sidewall 255 and the upper portion of the fourth sidewall 257.

Figure 4:
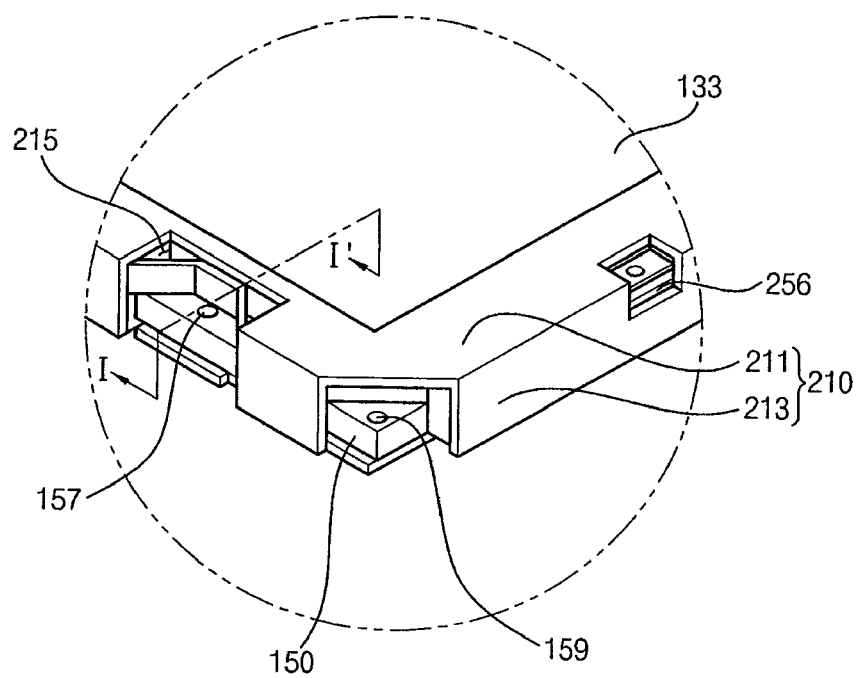
FIG. 4 is a perspective view of a display assembly showing combination method of connecting the rear receiving frame and the front receiving frame as described in FIG. 3.
Figure 5:
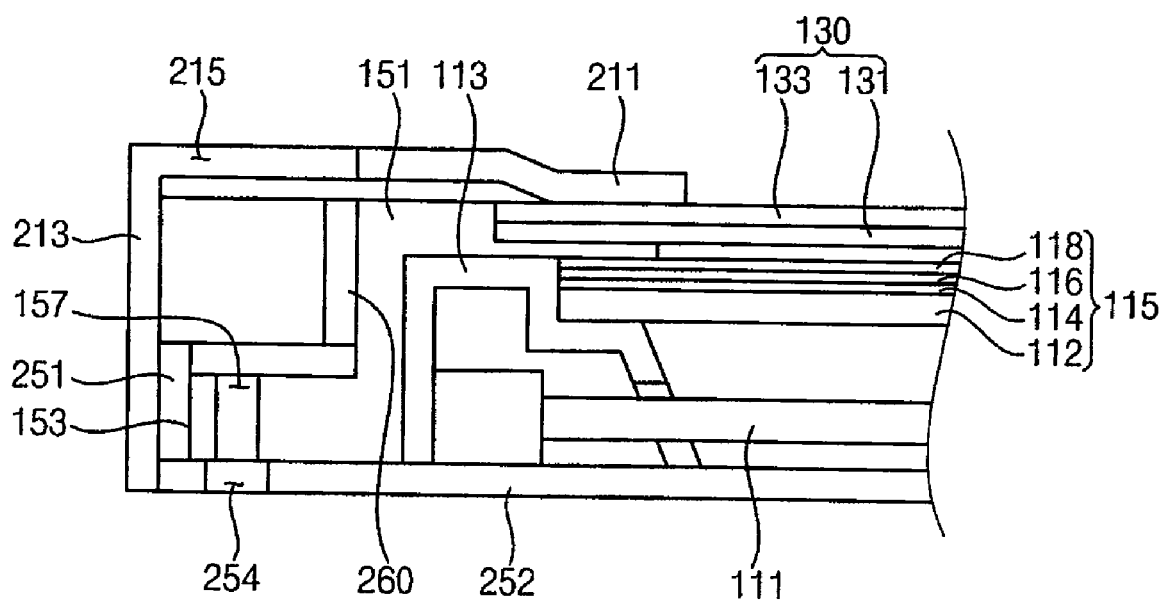
FIG. 5 is a cross-sectional view taken along a line I-I' in FIG. 4.

FIG. 4 is a perspective view of a display assembly illustrating a combination method of connecting the rear receiving frame and the front receiving frame as described in reference to FIG. 3. FIG. 5 is a cross-sectional view taken along a line I-I' in FIG. 4.

Referring to FIGS. 4 and 5, the front receiving frame 210 receives the rear receiving frame 250 receiving the supporting frame 150. The front receiving frame 210 includes the top surface part 211 and the side surface part 213.

The top surface part 211 has a four-cornered frame shape exposing the area corresponding to the display screen. The top surface part 211 supports the edge of the display panel arranged on the supporting frame 150. The side surface part 213 is arranged to face the outer surface of the first to the fourth sidewalls 251, 253, 255 and 257 of the rear receiving frame 250 from the edge of the top surface part 211.

The first opening 215 that exposes the combining recess 155 of the supporting frame 150 is formed in the top surface part 211. The first opening 215 is extended to the lower portion of the side surface part 213, and is exposed to the lower portion of the side surface part 213. Therefore, the bottom of the combining recess 155 and the first hole 157 are exposed by the first opening 215.

The side frame 113 is arranged in the inside surface of the side part 153 of the supporting frame 150, and the supporting part 151 of the supporting frame 150 presses the edge of the optical member supported by the side frame 113. The connecting member, for example, a screw, penetrates the second hole 254, the first hole 157 and the first opening 215, and the connecting member combines the display assembly 100 to the external housing, such as the cover by the front mounting method.

Referring to FIGS. 2, 3 and 4, the supporting frame 150 further includes the third hole 159 to reinforce the combination of the front mounting method. Referring to FIGS. 3 and 4, the third hole 159 is formed in the corner portion of the supporting part 151 corresponding to the corner portion 158 of the supporting frame at which the side parts 153 of the supporting frame 150 meet together, the side parts 153 being different in size.

In one aspect, the second opening exposing the corner portion of the supporting frame 158 is formed in the front receiving frame 210. That is, the corner portion of the front receiving frame 210 at which the different side surface parts 213 of the front receiving frame 210 meet each other is removed and the corner portion of the top surface part 211 of the front receiving frame 210 corresponding to the corner portion of the front receiving frame 210 is removed, and the second opening is formed.

In one aspect, the third opening exposing the corner portion of the supporting frame 158 is formed in the rear receiving frame 250. That is, the corner portion at which the first sidewall 251 of the rear receiving frame 250 and the third and fourth sidewalls 255 and 257 of the rear receiving frame 250 meet each other is removed, the corner portion at which the second sidewall 253, the third sidewall 255 and the fourth sidewall 257 meet each other is removed, and the third opening is formed.

Figure 6:
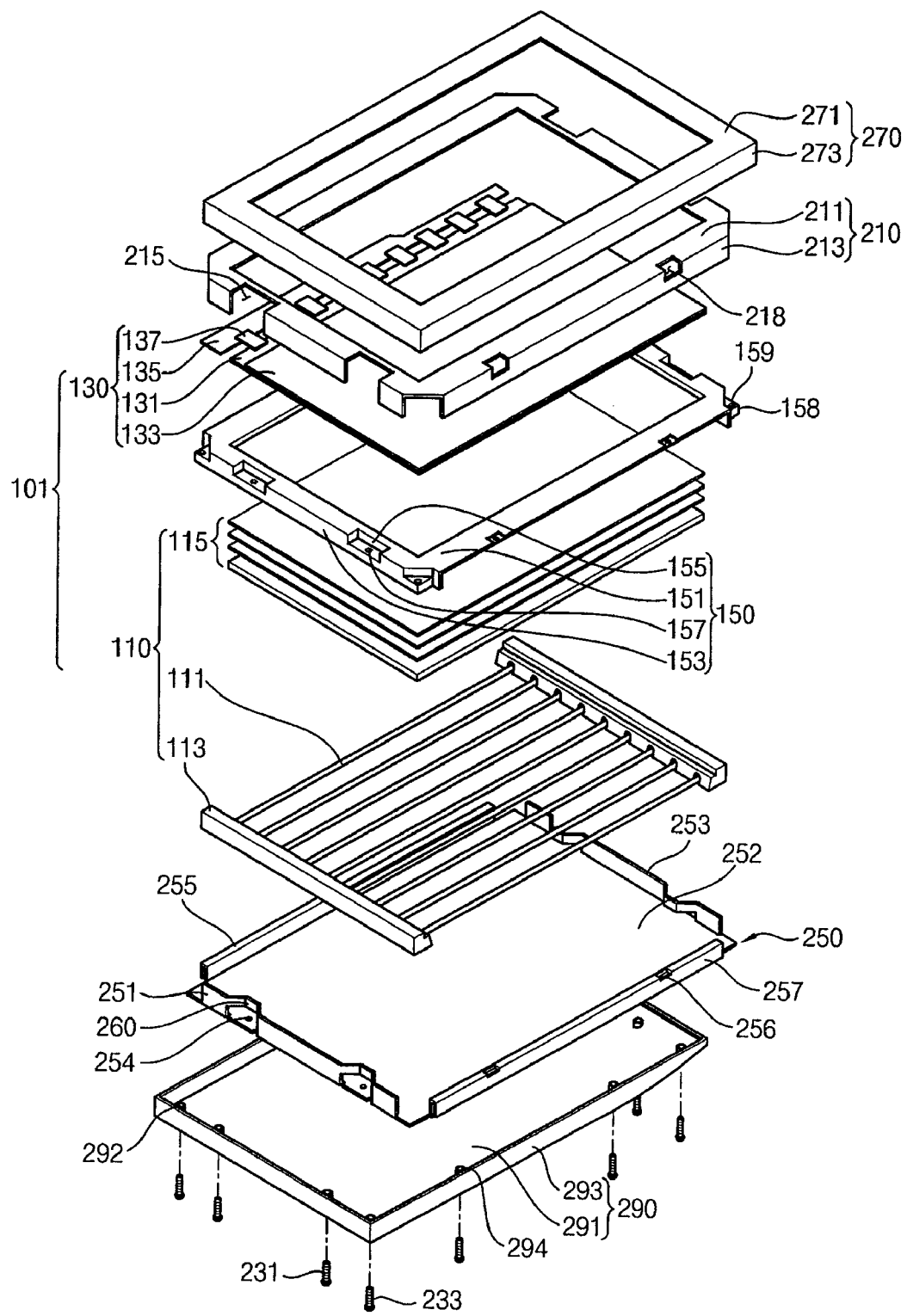
FIG. 6 is a perspective view of the display apparatus having a display assembly illustrated in FIGS. 1 and 5.

FIG. 6 is a perspective view of the display apparatus having a display assembly illustrated in FIGS. 1 and 5. Referring to FIG. 6, the display device 200 includes a display assembly 100, a front cover 270, a rear cover 290 and a first connecting member 231.

In one aspect, the display assembly 100 is substantially the same as described in FIGS. 1 and 5. Thus, the same reference numerals are used for the same elements and the repeated descriptions will be omitted.

In an example embodiment, the front cover 270 includes the front body and the first combining part. The front body includes the frame 271 and the front sidewall 273. The frame 271 exposes the display screen of the display panel, and covers the top surface part 211 of the front receiving frame 210. The front sidewall 273 is arranged in the outside of the side surface part 213 of the front receiving frame 210.

Figure 7:
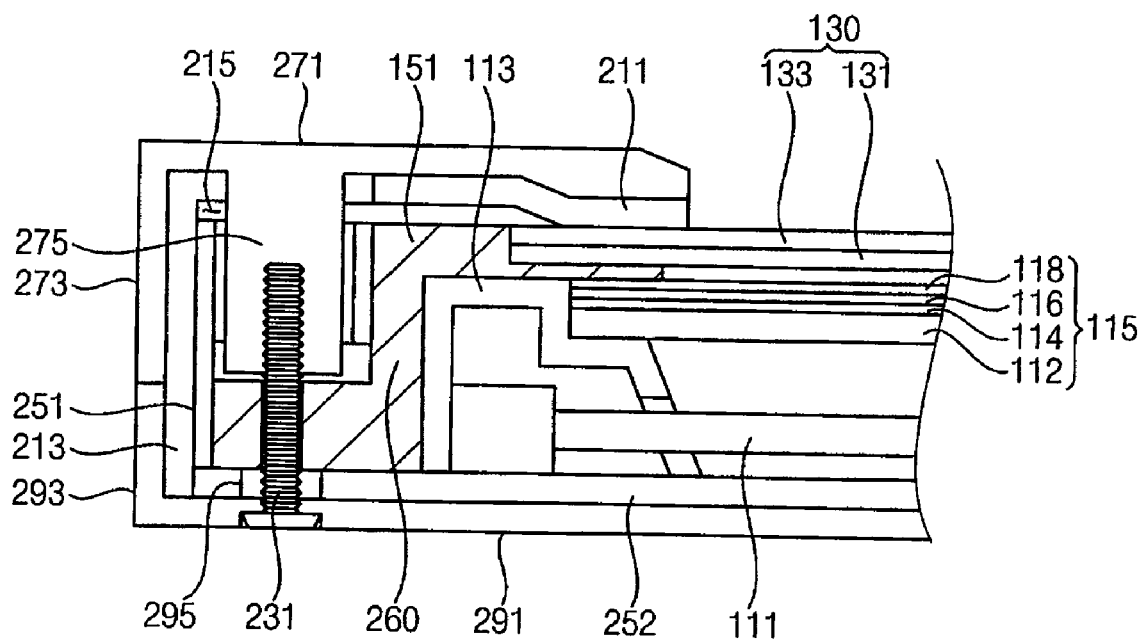
FIG. 7 is a cross-sectional view taken along a line II-II' in FIG. 6.

FIG. 7 is a cross-sectional view taken along a line II-II' in FIG. 6. Referring to FIG. 7, a first combining part 275 that is a combination boss extended from the front body is arranged in the bottom surface of the first hole 157 which is exposed from the first opening 215. The rear cover 290 includes a rear body and a second combining part 295. The rear body includes a rear surface part 291 and a rear sidewall 293. The rear surface part 291 covers the bottom part 252. The rear sidewall 293 is oppositely arranged to the side surface part 213 of the front receiving frame 210, and meets the lower portion of the front sidewall 273 of the front cover 270.

The second combining part 295 that is a combination boss extended from the rear body penetrates the second hole 254 exposed by the indentation of the incision portion, and is arranged in the lower portion of the first hole 157. Therefore, the first combining part 275 and the second combining part 295 are opposite to each other having the supporting frame 150.

The first connecting member 231 may be a screw. The first connecting member 231 that penetrates the second combining part 295, the second hole 254 and the first hole 157 from the rear surface part 291 are connected to the first combining part 275.

The front cover 270 further includes the third combining part. The third combining part that is extended from the front body is arranged to the upper portion of the third hole 159 which is formed in the corner portion 158 of the supporting frame.

The rear cover 290 further includes a fourth combining part. The fourth combining part extended from the rear body is arranged to the lower portion of the third hole 159.

The display device 200 includes the second connecting member 233 that is connected to the third combining part by penetrating the fourth combining part and the third hole 159.

According to one or more embodiments of the present disclosure, the structures of the front receiving frame 210, the supporting frame 150 and the rear receiving frame 250 are adjusted so that the display assembly 100 may be connected to the front cover 270 and/or the rear cover 290 by the front mounting method even without using a separate member such as a bracket which is arranged in the side surface of the display assembly 100 and connects the front cover 270 and/or the rear cover 290 to the display assembly 100.

Therefore, the width of the frame 271 of the front cover 270 defining the display screen of the display assembly 100 is greatly reduced. Further, the first reinforcement member 260 formed in one body to the sidewall of the rear receiving frame 250 compensates the loss of strength of the rear receiving frame 250 caused by the incision portion that is formed at the sidewall of the rear receiving frame 250, and maintains the strength of the rear receiving frame 250 over a certain level.

Figure 8:
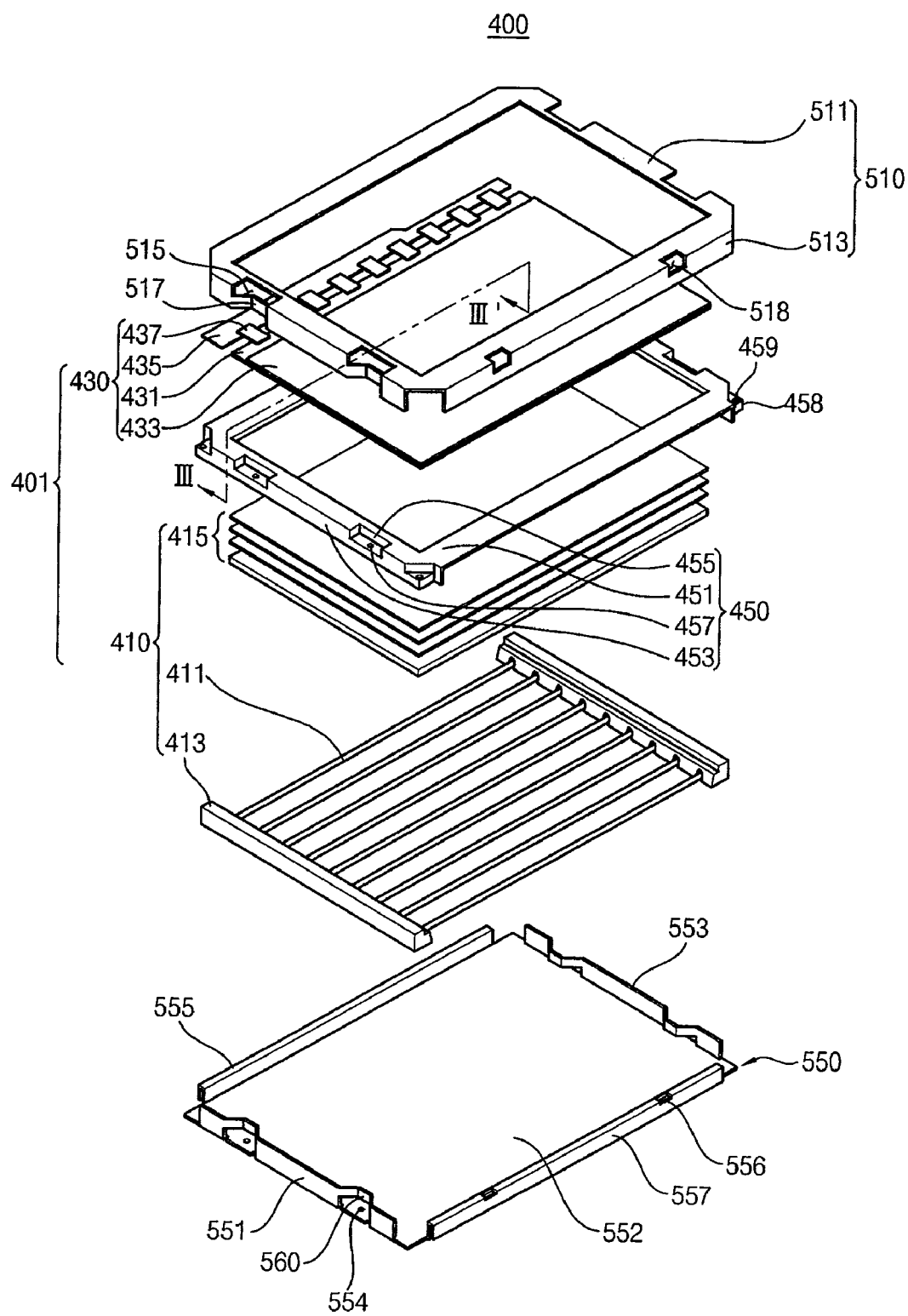
FIG. 8 is a perspective view showing a display assembly in accordance with some example embodiments of the present disclosure.
Figure 9:
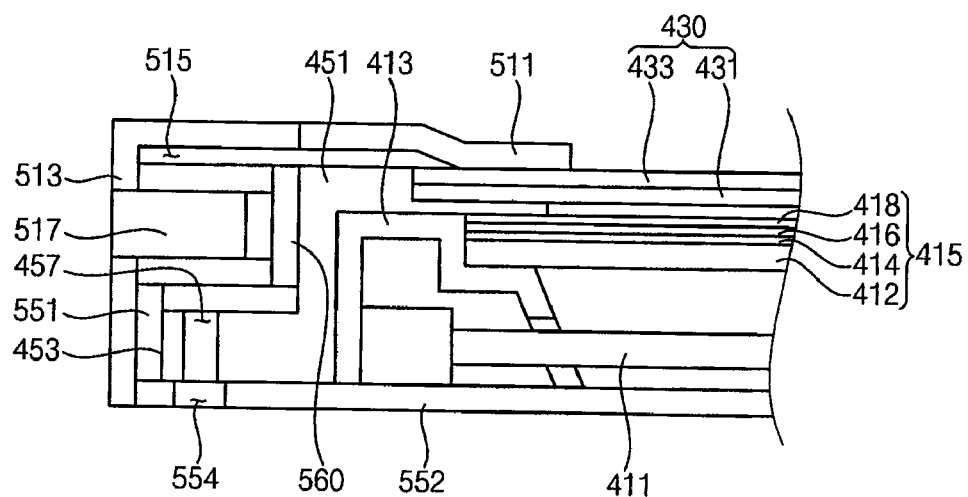
FIG. 9 is a cross-sectional view taken along a line III-III' in FIG. 8.

FIG. 8 is a perspective view illustrating a display assembly in accordance with one or more example embodiments of the present disclosure. FIG. 9 is a cross-sectional view taken along a line III-III' in FIG. 8.

Referring to FIGS. 8 and 9, a display assembly 400 in accordance with one or more example embodiments of the present disclosure includes a display module 401, a supporting frame 450, a front receiving frame 510 and a rear receiving frame 550. The display assembly 400 is substantially the same as a display assembly 100 described in FIGS. 1 to 5 except that the front receiving frame 510 includes a second reinforcement member 517. Thus, the same reference numerals are used for the same elements and the repetitive descriptions will be omitted.

The front receiving frame 510 includes a second reinforcement member 517, a top surface part 511 and a side surface part 513. The top surface part 511 covers an edge portion of a display panel of the display module 401. The top surface part 511 has a first opening 515 formed on an edge portion thereof. The first opening 515 exposes a combining recess 455 of the supporting frame 450. The first opening 515 is extended to a lower portion of the side surface part 513. The side surface part 513 is downwardly opened by the first opening 515. Thus, the edges opposite to each other are formed at the side surface part 513 by the first opening 515.

The second reinforcement member 517 is formed to be spaced apart from the lower portion of the side surface part 513. The second reinforcement member 517 connects the edges of the side surface part 513 to each other and is integrally formed with the edges of the side surface part 513. Thus, the second reinforcement member 517 may compensate strength of the front receiving frame 510, which is weakened by the first opening 515.

In an example embodiment, the second reinforcement member 517 is bent toward a side portion of the combining recess 455 to be received in the combining recess 455. The first reinforcement member 560 of the rear receiving frame 550 is received in the side portion of the combining recess 455, so that the second reinforcement member 517 may be overlapped with an outer surface of the first reinforcement member 560.

Figure 10:
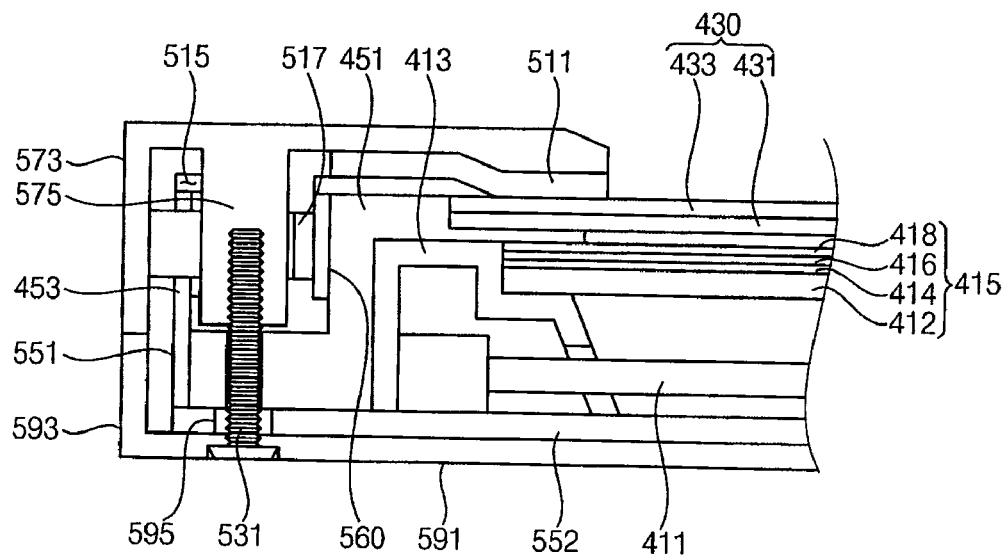
FIG. 10 is a plan view illustrating a display device having the display assembly in FIGS. 8 and 9.

FIG. 10 is a plan view illustrating a display device having the display assembly in FIGS. 8 and 9. The display device 500 is substantially the same as a display device 200 described in FIGS. 6 and 7 except that the display device 500 includes the display assembly 400 in FIGS. 8 and 9. Thus, the same reference numerals are used for the same elements and the repetitive descriptions will be omitted. Each of a front receiving frame 510, a supporting frame 450 and a rear receiving frame 550 has a characteristic structure for combining by the front mounting method and prevents the strength of a member from decreasing.

Figure 11:
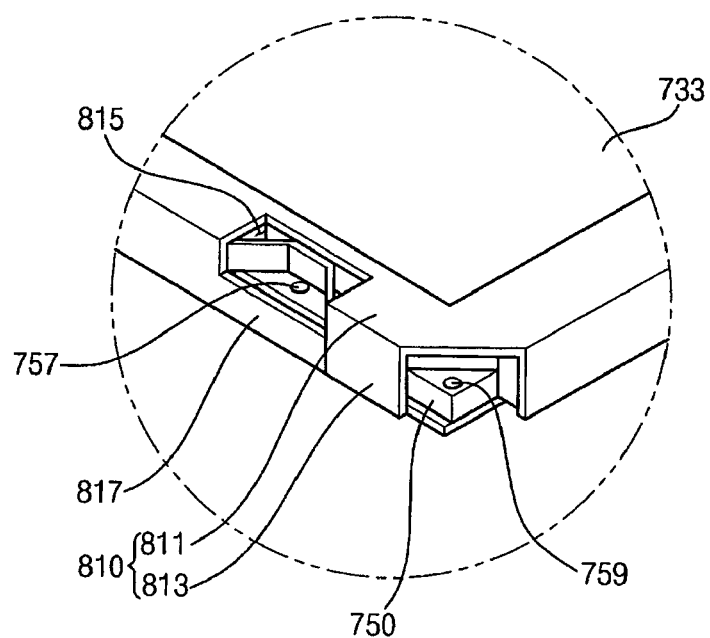
FIG. 11 is a perspective view of a display assembly in accordance with some example embodiments of the present disclosure.

FIG. 11 is a perspective view of a display assembly in accordance with some example embodiments of the present disclosure. Referring to FIG. 11, a display assembly 700 includes a display module, a supporting frame 750, a front receiving frame 810 and a rear receiving frame.

In one aspect, the display assembly 700 is substantially the same as a display assembly 100 described in FIGS. 1 and 5 except that the front receiving frame 810 includes a second reinforcement member 817. Thus, the same reference numerals are used for the same elements and the repetitive descriptions will be omitted.

The front receiving frame 810 includes a second reinforcement member 817, a top surface part 811 and a side surface part 813. The second reinforcement member 817 extends from a lower portion of the side surface part 813 and is integrated with the side surface part 813 into a single body. The second reinforcement member 817 is parallel with the side surface part 813 having a uniform width. The second reinforcement member 817 is opposite to a first reinforcement member 860 with respect to a first hole 757. That is, the first reinforcement member 860 is received in a combining recess 755, and the second reinforcement member 817 is disposed to cover a side part 753 of the supporting frame 750. In one aspect, the display device is substantially the same as a display device 200 described in FIGS. 6 and 7 except that the display device includes the display assembly 700 in FIG. 11. Thus, the same reference numerals are used for the same elements and the repetitive descriptions will be omitted.

Figure 12:
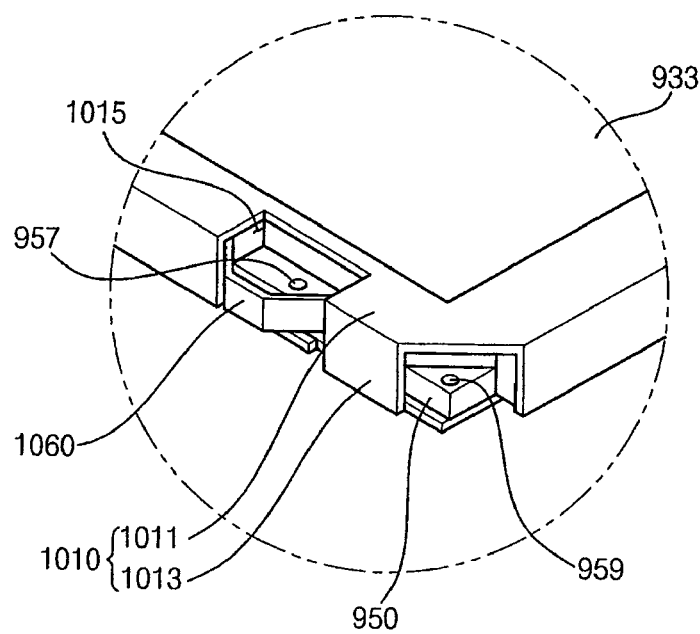
FIG. 12 is a perspective view showing a display assembly in accordance with some example embodiments of the present disclosure.

FIG. 12 is a perspective view illustrating a display assembly in accordance with some example embodiments of the present disclosure. Referring to FIG. 12, a display assembly 900 includes a display module (not shown), a supporting frame 950, a front receiving frame 1010 and a rear receiving frame.

In one aspect, the display assembly 900 is substantially the same as a display assembly 100 described in FIGS. 1 and 5 except for a shape of a first reinforcement member 1060 of the rear receiving frame. Thus, the same reference numerals are used for the same elements and the repetitive descriptions will be omitted.

The rear receiving frame 1050 includes a bottom part 1052 at which a second hole (not shown) is formed, a sidewall part (not shown), an incision part (not shown) and a first reinforcement member 1060. The first reinforcement member 1060 connects edges of the sidewall part formed by the incision part to each other. The first reinforcement member 1060 protrudes toward the side part 1013 of the front receiving frame 1010 to be inserted into a first opening 1015 as shown in FIG. 12.

The first reinforcement member 1060 may be inserted into the first opening 1015 to guide the rear receiving frame 1050 and the front receiving frame 1010 to a combined position where the rear receiving frame 1050 and the front receiving frame 1010 are combined with each other as well as to compensate for the strength of the rear receiving frame 1050 weakened by the incision part. The display device is substantially the same as a display device 200 described in FIGS. 6 and 7 except that the display device includes the display assembly 900 in FIG. 12. Thus, the same reference numerals are used for the same elements and the repetitive descriptions will be omitted.

Figure 13:
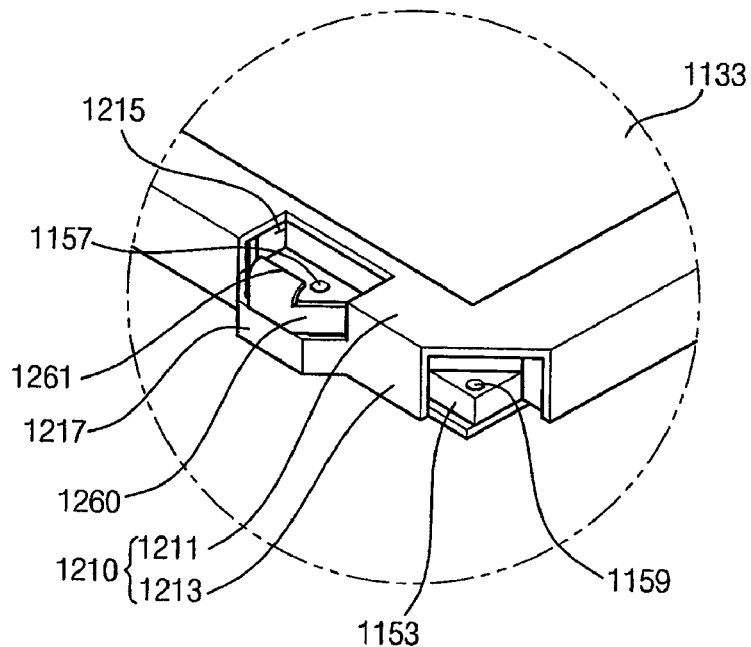
FIG. 13 is a perspective view showing a display assembly in accordance with some example embodiments of the present disclosure.

FIG. 13 is a perspective view illustrating a display assembly in accordance with some example embodiments of the present disclosure. In one aspect, referring to FIG. 13, a display assembly 1100 is substantially the same as a display assembly 100 described in FIGS. 1 and 5 except that a first reinforcement member 1260 of the rear receiving frame has a different shape and a front receiving frame 1210 includes a second reinforcement member 1217. Thus, the same reference numerals are used for the same elements and the repetitive descriptions will be omitted.

The first reinforcement member 1260 protrudes toward a side part 1213 of the front receiving frame 1210 to be inserted into a first opening 1215 formed at the side surface part 1213 as shown in FIG. 13. An inclined part 1261 inclining toward a side part 1153 of the supporting frame 1150 is formed on an upper edge of the first reinforcement member 1260.

The first reinforcement member 1260 may be inserted into the first opening 1215 to guide the rear receiving frame 1250 and the front receiving frame 1210 to a combined position where the rear receiving frame 1050 and the front receiving frame 1010 are combined with each other as well as to compensate for the strength of the rear receiving frame 1250 weakened by an incision part.

The second reinforcement member 1217 of the front receiving frame 1210 connects edges of the side surface part 1213 formed by the first opening 1215 to each other. The second reinforcement member 1217 protrudes outward. When the rear receiving frame 1250 and the front receiving frame 1210 are combined with each other, the second reinforcement member 1217 slides to be combined with the first reinforcement member 1260 along the inclined part 1261 of the first reinforcement member 1260. As a result, the first reinforcement member 1260 is disposed over an upper edge of the second reinforcement member 1217. The display device is substantially the same as a display device 200 described in FIGS. 6 and 7 except that the display device includes the display assembly 1100 in FIG. 13. Thus, the same reference numerals are used for the same elements and the repetitive descriptions will be omitted.

Figure 14:
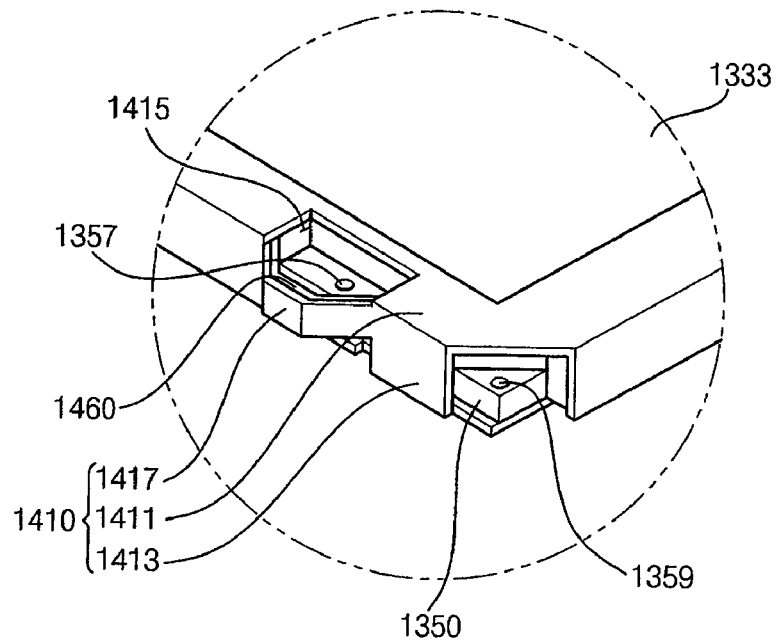
FIG. 14 is a perspective view showing a display assembly in accordance with some example embodiments of the present disclosure.

FIG. 14 is a perspective view illustrating a display assembly in accordance with some example embodiments of the present disclosure. In one aspect, referring to FIG. 14, a display assembly 1300 is substantially the same as a display assembly 100 described in FIGS. 1 and 5 except that a first reinforcement member 1460 of the rear receiving frame has a different shape and a front receiving frame 1410 further includes a second reinforcement member 1417. Thus, the same reference numerals are used for the same elements and the repetitive descriptions will be omitted.

The first reinforcement member 1460 protrudes toward a side surface part 1413 of the front receiving frame 1410 to be inserted into a first opening 1415 formed at the side surface part 1413. The first reinforcement member 1460 may be inserted into a first opening 1415 to guide the rear receiving frame 1450 and the front receiving frame 1410 to a combined position where the rear receiving frame 1450 and the front receiving frame 1410 are combined with each other as well as to compensate for the strength of the rear receiving frame 1450 weakened by an incision part.

The second reinforcement member 1417 of the front receiving frame 1410 connects edges of the side surface part 1413 formed by the first opening 1415 to each other. The second reinforcement member 1417 protrudes outward and is overlapped with an outer surface of the first reinforcement member 1460.

The display device is substantially the same as a display device 200 described in FIGS. 6 and 7 except that the display device includes the display assembly 1300 in FIG. 14. Thus, the same reference numerals are used for the same elements and the repetitive descriptions will be omitted.

Figure 15:
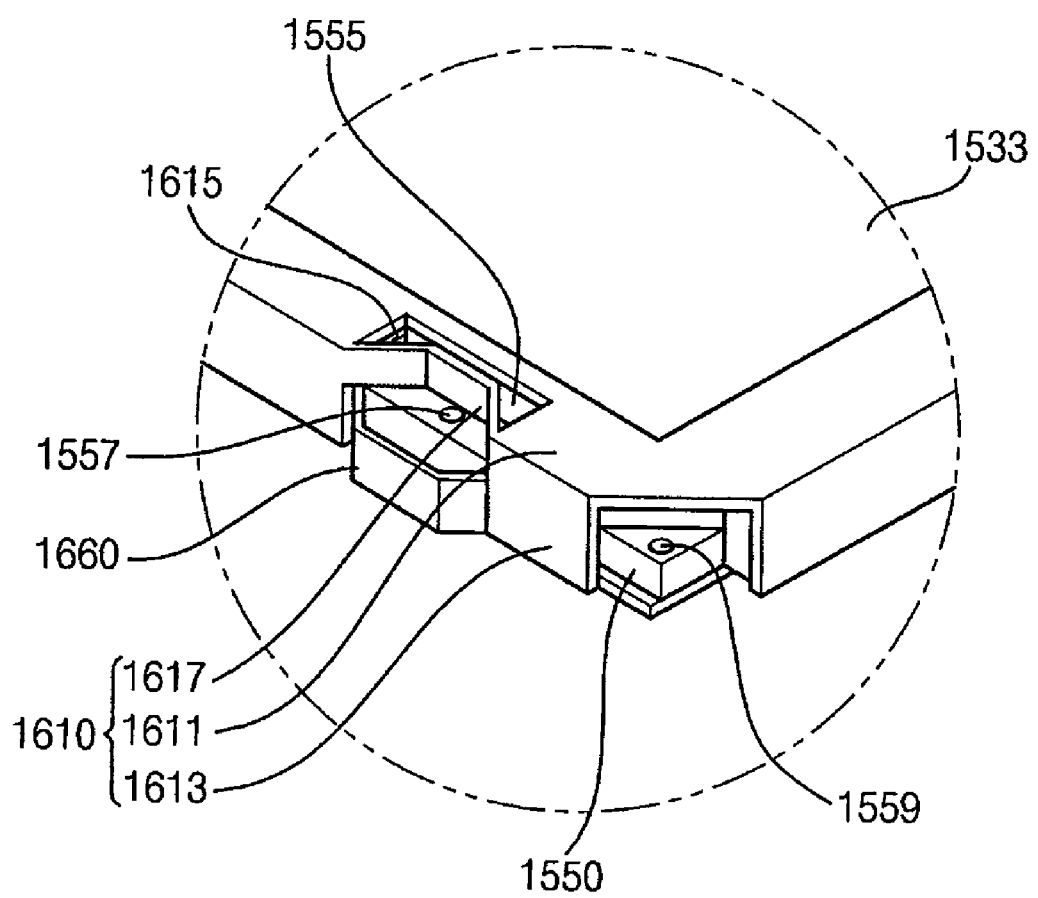
FIG. 15 is a perspective view showing a display assembly in accordance with some example embodiments of the present disclosure.

FIG. 15 is a perspective view illustrating a display assembly in accordance with some example embodiments of the present disclosure. In one aspect, referring to FIG. 15, a display assembly 1500 is substantially the same as a display assembly 100 described in FIGS. 1 and 5 except that a first reinforcement member 1660 of the rear receiving frame has a different shape and a front receiving frame 1610 includes a second reinforcement member 1617. Thus, the same reference numerals are used for the same elements and the repetitive descriptions will be omitted.

The first reinforcement member 1660 protrudes toward a side surface part 1613 of the front receiving frame 1610 to be inserted into a first opening 1615 formed at the side surface part 1613 as shown in FIG. 14. The first reinforcement member 1660 may be inserted into a first opening 1615 to guide the rear receiving frame 1650 and the front receiving frame 1610 to a combined position where the rear receiving frame 1650 and the front receiving frame 1610 are combined with each other. Also, the first reinforcement member 1660 may compensate the strength of the rear receiving frame 1650 weakened by an incision part.

The second reinforcement member 1617 of the front receiving frame 1610 is opposite to the first reinforcement member 1617 to be disposed at an upper of the first reinforcement member 1617 with respect to a first hole 1557 formed through a combining recess 1555 of a supporting frame 1550. That is, the second reinforcement member 1617 may be received in the combining recess 1555 and have a rounded shape. The display device is substantially the same as a display device 200 described in FIGS. 6 and 7 except that the display device includes the display assembly 1500 in FIG. 15. Thus, the same reference numerals are used for the same elements and the repetitive descriptions will be omitted.

Figure 16:
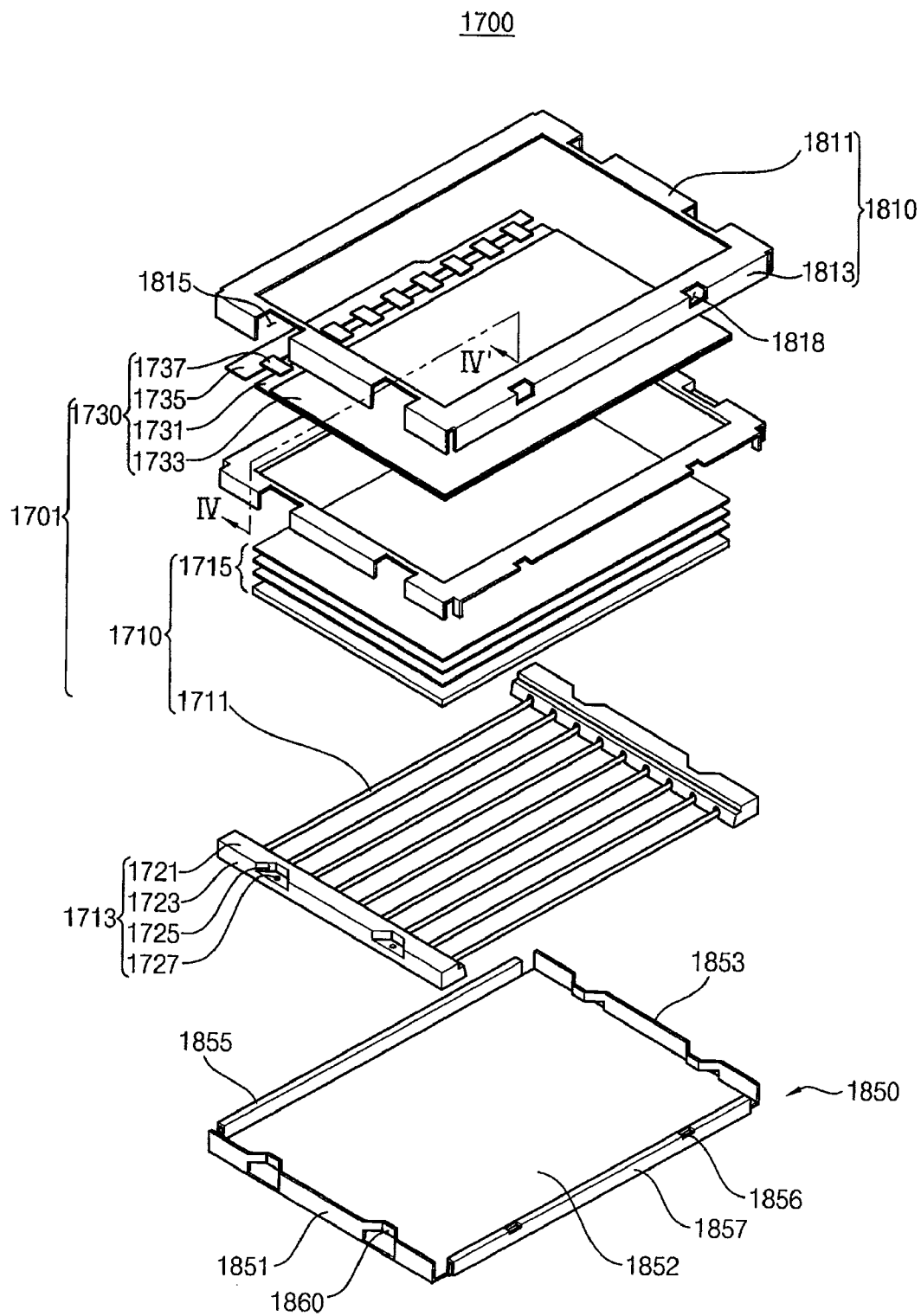
FIG. 16 is a perspective view showing a display assembly in accordance with some example embodiments of the present disclosure.

FIG. 16 is a perspective view illustrating a display assembly in accordance with some example embodiments of the present disclosure. In one aspect, referring to FIG. 16, a display assembly 1700 includes a display module 1701, a supporting frame 1750, a front receiving frame 1810 and a rear receiving frame 1850. The display module 1701 includes a backlight part 1710 and a display panel part 1730.

The backlight part 1710 is substantially the same as a backlight part 110 described in FIGS. 1 to 5 except that the backlight part 1710 does not include a side frame 113 described in FIG. 2. The backlight part 1710 includes a lamp unit 1711 and an optical member 1715. Thus, the same reference numerals are used for the same elements and the repeated descriptions will be omitted.

The display panel part 1730 is substantially the same as a display panel part 130 described in FIGS. 1 to 5. Thus, the same reference numerals are used for the same elements and the repetitive descriptions will be omitted.

Figure 17:
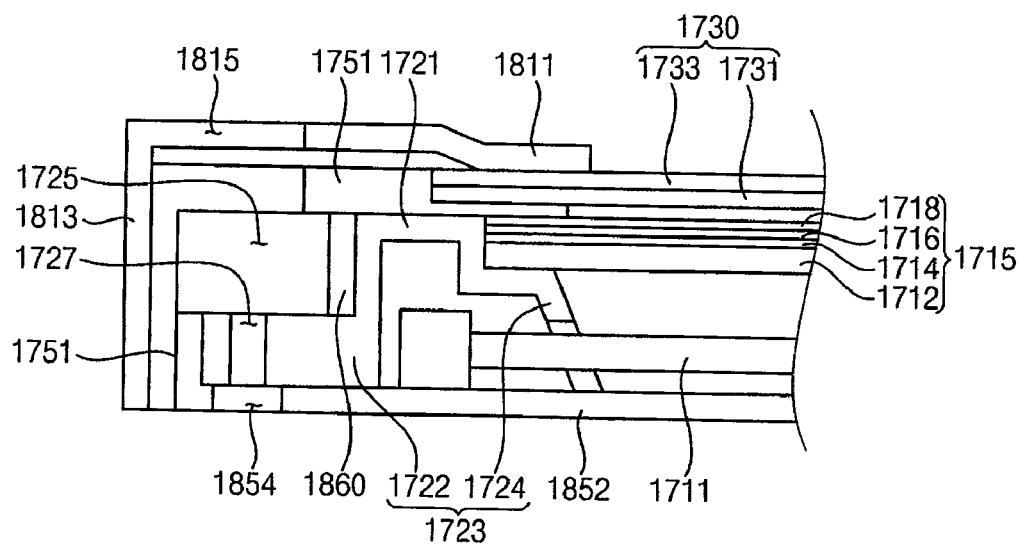
FIG. 17 is a cross-sectional view taken along a line IV-IV' in FIG. 16.

FIG. 17 is a cross-sectional view taken along a line IV-IV' in FIG. 16. In one aspect, referring to FIGS. 16 and 17, the display assembly 1700 does not include a supporting frame 150 described in FIGS. 1 to 5. In this embodiment, the supporting frame 1713 corresponds to a side frame 113 described in FIG. 2. The supporting frame 1713 is substantially the same as the side frame 113 described in FIG. 2 except that the supporting frame 1713 further includes a combining recess 1725. The supporting frame 1713 includes a supporting part 1721 and a side part 1723.

As shown in FIG. 17, the supporting part 1721 includes a step portion supporting the optical member 1715. The side part 1723 includes an inner part 1724 and an outer part 1722, which are formed at each of edges of the supporting part 1721, respectively. The edges are opposite to each other. The inner part 1724 and the outer part 1722 are spaced apart from each other. A lamp holder is disposed between the inner part 1724 and the outer part 1722. A combining recess 1725 is formed at a corner at which the outer part 1722 and the supporting part 1721 meet together. A first hole 1727 is formed on a bottom surface of the combining recess 1725. Guide holes guiding lamps are formed at the inner part 1724.

Figure 18:
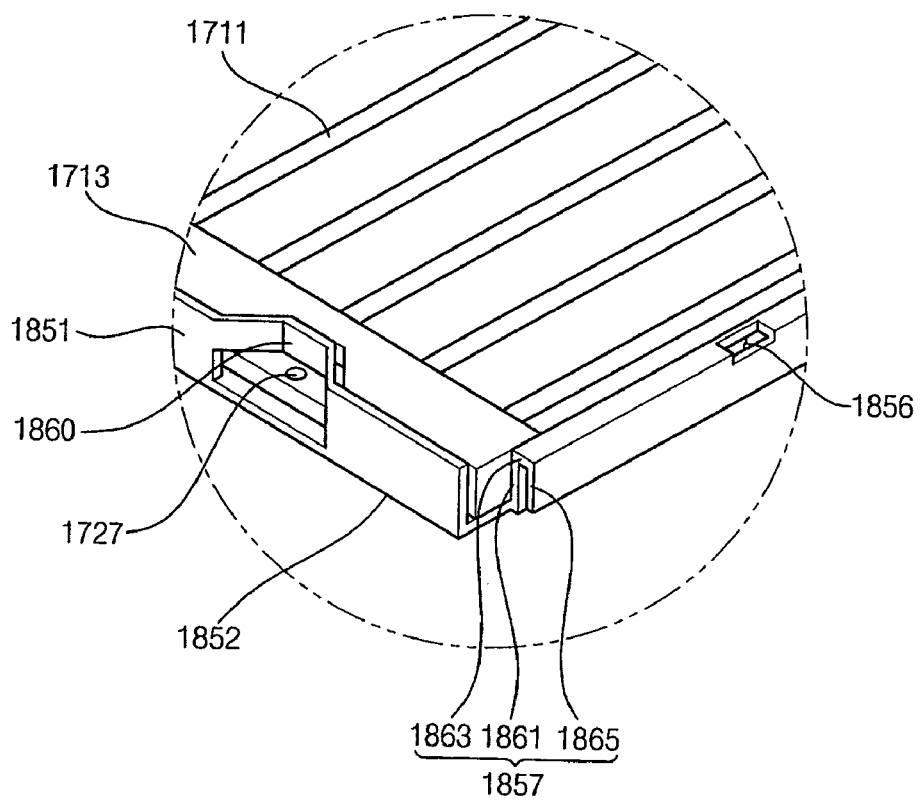
FIG. 18 is a perspective view showing a combination of the rear receiving frame and the supporting frame in FIG. 16.

FIG. 18 is a perspective view illustrating a combination of the rear receiving frame and the supporting frame in FIG. 16. Referring to FIGS. 16 to 18, the rear receiving frame 1850 includes a bottom part 1852, a sidewall part (not shown) and a first reinforcement member 1860. The rear receiving frame 1850 is substantially the same as a rear receiving frame 250 described in FIGS. 1 to 5 except that a third opening is not formed at a corner thereof. Therefore, the rear receiving frame 1850 includes the bottom part 1852, a first sidewall 1851 having an incision part, a second sidewall 1853, a third sidewall 1855 and a fourth sidewall 1857. The third sidewall 1855 and the fourth sidewall 1857 may include a first side 1861, a second side 1863 and a third side 1865, respectively.

The first side 1861 protrudes upward from the bottom part 1852. The third side 1865 is disposed outside to be parallel with the first side 1861. The second side 1863 connects the first side 1861 to an upper portion of the third side 1865. A fourth opening 1856 for a front mounting method may be formed at a corner where the second side 1863 and the third side 1865 meet together. The supporting frame 1713 is disposed on the bottom part 1852. The side surface part 1723 is supported by the bottom part 1852. Thus, the same reference numerals are used for the corresponding elements, respectively, and the repetitive descriptions will be omitted In one embodiment, a first reinforcement member 1860 is received in the combining recess 1725 formed on the supporting frame 1713 because the supporting frame 1713 is received in the rear receiving frame. The first reinforcement member 1860 is bent along a side of the combining recess to expose a first hole 1727 formed at a bottom of the combining recess 1725.

Referring to FIG. 16 again, the display assembly 1700 may further comprise a middle mold frame 1750. The middle mold frame 1750 corresponds to the supporting frame 150 described in FIGS. 1 to 5.

Figure 19:
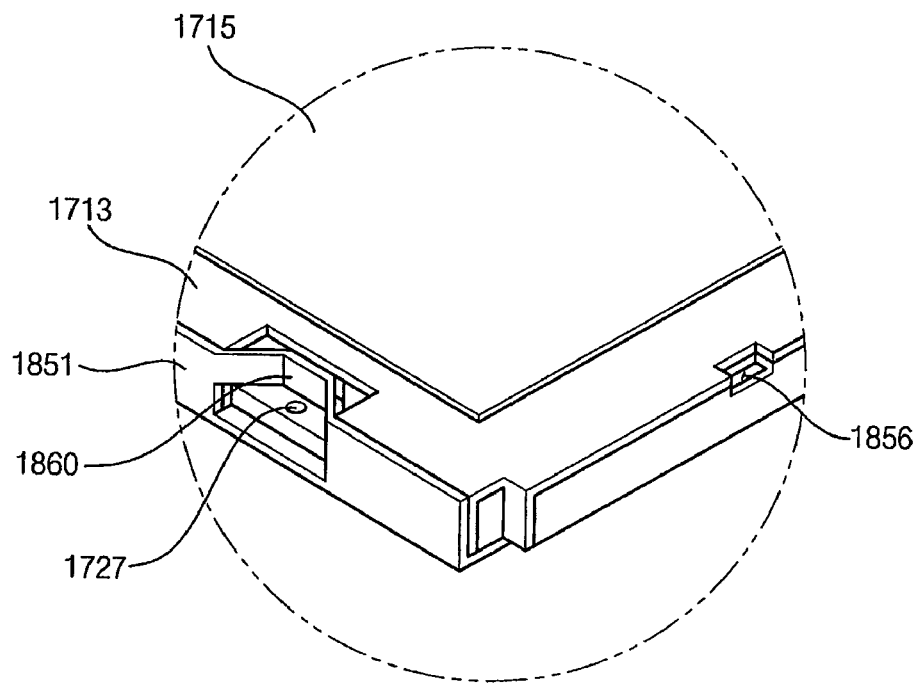
FIG. 19 is a perspective view showing a combination of the supporting frame, the rear receiving frame and the middle mold frame.

FIG. 19 is a perspective view illustrating a combination of the supporting frame, the rear receiving frame and the middle mold frame. Referring to FIG. 19, the middle mold frame includes an upper frame 1751 and a side frame 1753.

The upper frame 1751 has a rectangular shape and supports a display panel. The upper frame 1751 presses an edge portion of an optical member 1715 supported by the supporting part 1721. The upper frame 1751 may be supported by the supporting part 1721 of the supporting frame 1713, the upper portion of the third sidewall and the upper portion of the fourth sidewall 1857 of the rear receiving frame 1850. The upper frame 1751 includes first sides opposing to each other, and second sides, which are substantially longer than the first sides and opposite to each other.

Figure 20:
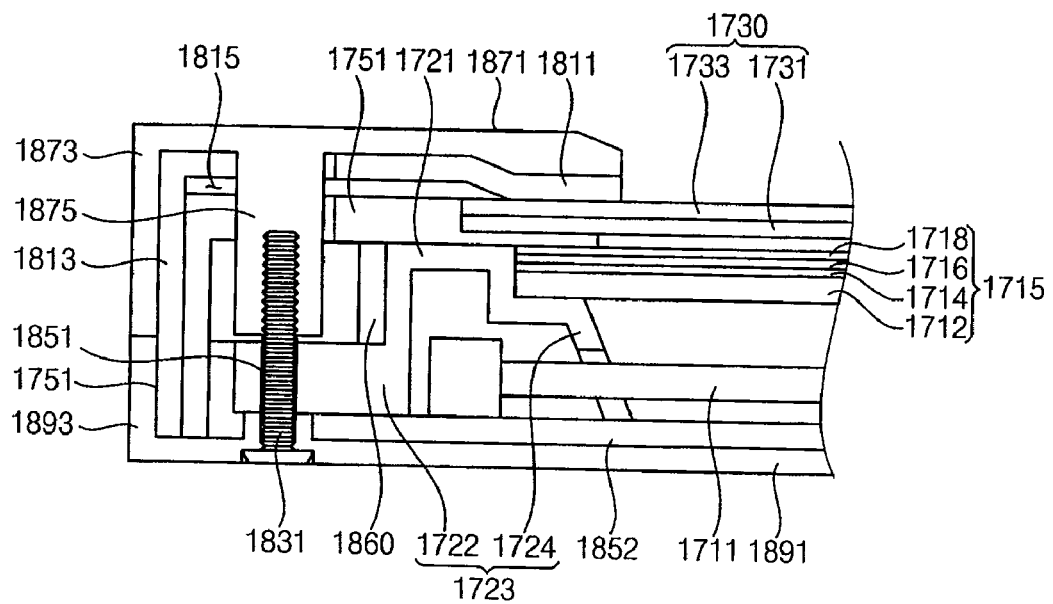
FIG. 20 is a cross-sectional view showing a display device having a display assembly in FIG. 19.

The side frames 1753 extend downwardly from the first sides of the upper frame 1751 and toward a direction substantially perpendicular to the upper frame 1751. The side frames cover the first and the second sides of the rear receiving frame 1850. As shown in FIG. 16, the side frames 1753 may not be formed on the second sides of the upper frame 1751. Fifth openings exposing the fourth openings 1856 of the rear receiving frame 1850 and the combining recess 1725 of the supporting frame 1713 are formed on at edges of the upper frame 1751. The fifth openings 1755 extend to a lower portion of the side frames to be exposed. The front receiving frame 1810 is substantially the same as the front receiving frame 810 described in FIG. 11 except that second openings expose a corner part of the supporting frame. Thus, the same reference numerals are used for the corresponding elements, respectively, and the repetitive descriptions will be omitted FIG. 20 is a cross-sectional view illustrating a display device 1800 having the display assembly in FIG. 19. Referring to FIG. 20, a display device 1800 includes a display assembly 1700, a front cover, a rear cover and a first combining member 1831.

The display device 1800 is substantially the same as a display device 200 described in FIGS. 6 and 7 except that the display device includes the display assembly 1700 in FIGS. 16 to 19. Thus, the same reference numerals are used for the same elements and the repetitive descriptions will be omitted.

According to one or more embodiments of the present disclosure, a display assembly may be combined with a front cover and/or a rear cover by a front mounting method without a member such as bracket. Hence, a width of the frame of a front cover defining a display screen of a display assembly and a volume of a device may be largely reduced. Further, a first reinforcement member formed at a sidewall of a rear receiving frame as a single body with the rear receiving frame may compensate the strength of the rear receiving frame weakened by an incision part formed at a sidewall of the rear receiving frame. Thus, the present disclosure may be applied to reduce a size of a flat display device and improve the combined structure.

The foregoing is illustrative of the present disclosure and is not to be construed as limiting thereof. Although a few example embodiments of the present disclosure have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function, and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A display assembly comprising:
   a display module for displaying an image;
   a supporting frame including a supporting part that supports the display module, a side part connected to the supporting part, at least one combining recess formed on an edge formed between the side part and an upper surface of the supporting part, and a first hole formed through a bottom surface of the combining recess;
   a front receiving frame having a top surface part covering a peripheral portion of a display screen of the display module and having a first opening exposing the first hole, and a side surface part extending from the top surface part, and being opposite to the side part of the supporting frame; and
   a rear receiving frame including a bottom part, a sidewall part, an incision portion and a first reinforcement member, the bottom part supporting a rear surface of the display module and having a second hole corresponding to the first hole, the sidewall part being disposed between the side part and the side surface part, the incision portion forming an indentation to expose the second hole, the first reinforcement member connecting edges of the sidewall part to each other.

2. The display assembly of claim 1, wherein the first reinforcement member extending from the edges of the sidewall part fits into the combining recess thereby fixing the supporting frame with the rear receiving frame.

3. The display assembly of claim 2, wherein the first opening exposes the side surface part and the front receiving frame comprises a second reinforcement member connecting opposite edges of the side surface portion.

4. The display assembly of claim 3, wherein the second reinforcement member is bent to be spaced apart from the first hole so that the second reinforcement member is received in the combining recess.

5. The display assembly of claim 4, wherein the second reinforcement member is spaced apart from a lower portion of the side surface part.

6. The display assembly of claim 3, wherein the second reinforcement member is opposite to the first reinforcement member with respect to the first hole.

7. The display assembly of claim 1, wherein the first opening expose the side surface and the first reinforcement member protrudes from the edges of the sidewall part toward the side surface part so that the first reinforcement member is inserted into the first opening.

8. The display assembly of claim 7, wherein the front receiving frame comprises a second reinforcement member connecting opposite edges of the side surface portion.

9. The display assembly of claim 8, wherein the first reinforcement member is arranged on an upper edge of the second reinforcement member.

10. The display assembly of claim 8, wherein the second reinforcement member is overlapped with an outer surface of the first reinforcement member.

11. The display assembly of claim 8, wherein the second reinforcement member is disposed on the first reinforcement member and is opposite to the first reinforcement member with respect to the first hole to be received in the combining recess.

12. The display assembly of claim 1, wherein the supporting frame comprises a third hole corresponding to a corner portion of the supporting frame, and wherein the corner portion is formed by connecting side parts of the supporting frames.

13. The display assembly of claim 12, wherein the front receiving frame comprises a second opening formed at a front corner of the front receiving frame corresponding to the corner portion of the supporting frame, the second opening exposing the third hole, and the rear receiving frame further comprises a third opening formed at a rear corner of the rear receiving frame corresponding to the supporting frame corner, wherein the third opening exposes the third hole.

14. The display assembly of claim 1, wherein the display module comprises:
  a backlight part emitting light and being received in the rear receiving frame; and
  a display panel unit received in the front receiving frame, supported by the upper surface of the supporting part, and displaying the image based on the light,
  wherein the backlight part includes:
  a plurality of lamp units disposed on the bottom part in a direction substantially perpendicular to the sidewall part;
  a side frame having a plurality of guide recesses receiving edge portions of the lamp units and disposed between the bottom part and the supporting part; and
  an optical member disposed between an upper portion of the side frame and a lower surface of the supporting part.

15. The display assembly of claim 1, wherein the display module comprises:
  a backlight part emitting light and being received in the rear receiving frame; and
  a display panel unit received in the front receiving frame, supported by the upper surface of the supporting part, and displaying the image based on the light,
  wherein a plurality of guide recesses is formed at an inner surface of the side part opposite to the combing recess, and wherein the backlight part includes a plurality of lamp units received in the guide recesses, respectively, and an optical member disposed between the upper surface of the supporting part and a lower surface of the display panel unit.

16. A display device comprising:
  a display module for displaying an image;
  a supporting frame including a supporting part supporting the display module, a side part extending from an edge portion of the supporting part, at least one combining recess formed on an edge formed between the side part and an upper surface of the supporting part, and a first hole formed through a bottom surface of the combining recess;
  a front receiving frame having a top surface part covering a peripheral portion of a display screen of the display module and having an first opening exposing the first hole, and a side surface part extending from the top surface part, and being opposite to the side part of the supporting frame;
  a rear receiving frame including a bottom part, a sidewall part, an incision portion and a first reinforcement member, the bottom part supporting a rear face of the display module and having a second hole corresponding to the first hole, the sidewall part being disposed between the side part and the side surface part, the incision portion forming an indentation to expose the second hole, the first reinforcement member connecting edges of the sidewall portion to each other, the edges of the sidewall portion being formed by the incision portion;
  a front cover receiving the front receiving frame to expose the display screen;
  a rear cover opposite to the front cover and combined with the front cover to receive the rear receiving frame; and
  a connecting member inserted into the first and second holes to connect the front cover to the rear cover.

17. The display device of claim 16, wherein the front cover includes a front body receiving the front receiving frame and a combining part extending from the front body to penetrating the first opening to be disposed on the bottom surface, and wherein the connecting member is inserted into the combining part through the rear cover, the second hole and the first hole.

18. The display device of claim 16, wherein the front receiving frame comprises a second reinforcement member connecting opposite edges of the side surface part opened to a lower portion of the front receiving frame by the first opening.

19. The display device of claim 18, wherein the first and the second reinforcement members are bent to be spaced apart from the first hole so that the first and the second reinforcement members are received in the combining recesses, respectively.

20. The display device of claim 18, wherein the first and the second reinforcement members are disposed at an opposite side of the combining recess with respect to the first hole.

21. The display device of claim 20, wherein the first reinforcement member is overlapped with an upper edge portion of the second reinforcement member.

22. The display device of claim 20, wherein the second reinforcement member is overlapped with an outer surface of the first reinforcement member.

23. The display device of claim 18, wherein a first member of the first and second reinforcement members is received in the combining recess to be spaced apart from the first hole, and wherein a second member of the first and second reinforcement members protrudes toward a direction opposite to the combining recess.

24. A display assembly comprising:

a display module having a display screen for displaying an image;

a supporting frame adapted to support the display module, the supporting frame having at least one combining recess formed on a peripheral edge and a first hole formed through a bottom surface of the combining recess;

a front receiving frame adapted to support the display screen of the display module, the front receiving frame having a first opening exposing the first hole; and a rear receiving frame adapted to support the display module, the rear receiving frame having a second hole corresponding to the first hole of the supporting frame, an incision portion exposing the second hole, and at least one reinforcement member adapted to receive the supporting frame adjacent to the at least one combining recess;

wherein the supporting frame is positioned between the front receiving frame and the rear receiving frame.

25. The display assembly of claim 24, wherein the supporting frame comprises:

a supporting part for supporting the display module; and a side part connected to the supporting part.

26. The display assembly of claim 25, wherein the at least one combining recess is formed on the peripheral edge between the side part and an upper surface of the supporting part.

27. The display assembly of claim 24, wherein the front receiving frame comprises:

a top surface part supporting a peripheral portion of the display screen of the display module; and a side surface part extending from the top surface part, wherein the side surface part is opposite to the side part of the supporting frame.

28. The display assembly of claim 24, wherein the rear receiving frame comprises a bottom part that supports a rear surface of the display module, wherein the second hole is formed in a peripheral portion of the bottom part so as to correspond to the first hole.

29. The display assembly of claim 24, wherein the rear receiving frame comprises a sidewall part disposed between a side part of the supporting frame and a side surface part of the front receiving frame.

30. The display assembly of claim 29, wherein the incision portion of the rear receiving frame exposes the sidewall part to expose the second hole, and wherein the at least one reinforcement member connects edges of the sidewall part to each other.

* * * * *